US012598365B2

(12) United States Patent
Hong et al.

(10) Patent No.: US 12,598,365 B2
(45) Date of Patent: Apr. 7, 2026

(54) OBJECT ATTRIBUTE-BASED WATERMARKING METHOD FOR PREVENTING LEAKAGE OF DIGITAL CONTENT

(71) Applicant: Korea Electronics Technology Institute, Seongnam-si (KR)

(72) Inventors: Ji Soo Hong, Seoul (KR); Sung Hee Hong, Seoul (KR); Young Min Kim, Seoul (KR); Jin Soo Jeong, Seoul (KR); Yong Hwa Kim, Gunpo-si (KR); Byoung Hyo Lee, Seoul (KR); Hyeon Chan Oh, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 174 days.

(21) Appl. No.: 18/344,065

(22) Filed: Jun. 29, 2023

(65) Prior Publication Data

US 2024/0397167 A1 Nov. 28, 2024

(30) Foreign Application Priority Data

May 23, 2023 (KR) ........................ 10-2023-0066130

(51) Int. Cl.
*H04N 21/8358* (2011.01)
*H04N 21/234* (2011.01)
(Continued)

(52) U.S. Cl.
CPC ... *H04N 21/8358* (2013.01); *H04N 21/23418* (2013.01); *H04N 21/2393* (2013.01); *H04N 21/2407* (2013.01)

(58) Field of Classification Search
CPC ......... H04N 21/8358; H04N 21/23418; H04N 21/2393; H04N 21/2407
See application file for complete search history.

(56) References Cited

U.S. PATENT DOCUMENTS 10,834,457 B1 * 11/2020 Bourgoyne ........ H04N 21/4318
2017/0155933 A1 * 6/2017 Del Strother ...... H04N 21/4334
(Continued)

FOREIGN PATENT DOCUMENTS

JP 2004-328486 A 11/2004
JP 2006-252315 A 9/2006
(Continued)

OTHER PUBLICATIONS

Korean Office Action Issued on Jan. 20, 2025, in Counterpart Korean Patent Application No. 10-2023-0066130 (5 Pages in English, 7 Pages in Korean).

*Primary Examiner* — Nicholas T Corbo
(74) *Attorney, Agent, or Firm* — NSIP Law

(57) ABSTRACT

There is provided an object attribute-based watermarking method for preventing leakage of a digital content. A video watermarking method according to an embodiment may acquire a requested video and watermarking information upon receiving a request for video streaming from a user, may determine some of objects appearing in the video according to the watermarking information, may transform attributes of the determined objects, and may stream the transformed video. Accordingly, by watermarking an attribute of an object appearing in a video differently according to a user and providing the video, a watermark may be difficult to perceive, robustness against various attacks may be guaranteed, and a leakage path of a content may be checked.

18 Claims, 4 Drawing Sheets

Example scene of video for User A

Background object
(Attribute: Color A)

Main, important
object

Background object
(Attribute: Texture A)

(51) Int. Cl.
    *H04N 21/239*     (2011.01)
    *H04N 21/24*     (2011.01)

(56)           References Cited

U.S. PATENT DOCUMENTS

| | | | |
|---|---|---|---|
| 2019/0164250 A1* | 5/2019 | Li | H04N 21/23418 |
| 2019/0218407 A1* | 7/2019 | Borras | H04L 63/0442 |
| 2021/0352381 A1* | 11/2021 | Kilstein | H04N 21/23418 |
| 2021/0357482 A1* | 11/2021 | Devir | H04N 5/913 |

FOREIGN PATENT DOCUMENTS

| | | |
|---|---|---|
| KR | 10-2012-0113167 A | 10/2012 |
| KR | 10-1432329 B1 | 8/2014 |
| KR | 10-2021-0062956 A | 6/2021 |

* cited by examiner

Example scene of video for User A

Background object
(Attribute: Color A)

Main, important
object

Background object
(Attribute: Texture A)

Example scene of video for User B

Background object
(Attribute: Color B)

Main, important
object

Background object
(Attribute: Texture B)

OBJECT ATTRIBUTE-BASED WATERMARKING METHOD FOR PREVENTING LEAKAGE OF DIGITAL CONTENT

CROSS-REFERENCE TO RELATED APPLICATION(S) AND CLAIM OF PRIORITY

This application is based on and claims priority under 35 U.S.C. § 119 to Korean Patent Application No. 10-2023-0066130, filed on May 23, 2023, in the Korean Intellectual Property Office, the disclosure of which is herein incorporated by reference in its entirety.

BACKGROUND

Field

The disclosure relates to a digital content work protection technology, and more particularly, to a watermarking method for preventing leakage of a digital content and tracing a leakage path when the content is leaked.

Description of Related Art

Watermark technology for preventing leakage of contents such as digital cinema, video, or the like has developed various methods to protect content copyrights, and in particular, copyright protection technology is developing to be able to provide a service to a user through an imperceptible watermarking technique of disabling perception of a watermark, and simultaneously, to grasp a content leakage path.

Such watermarking technology should be able to authenticate against various attacks and should have robustness to have integrity. However, related-art technology employs a method of implanting a user-specific code by utilizing various characteristics of an image, and there may be techniques for having robustness, but the related-art technology may have a disadvantage of being vulnerable to new temporal, spatial attacks.

SUMMARY

The disclosure has been developed in order to solve the above-described problems, and an object of the disclosure is to provide an imperceptible watermarking method which is capable of grasping a video leakage path based on attributes of objects appearing in a video.

According to an embodiment of the disclosure to achieve the above-described object, a video watermarking method may include: receiving a request for video streaming from a user; acquiring the requested video and watermarking information; determining some of objects appearing in the video according to the watermarking information; transforming attributes of the determined objects; and streaming the transformed video.

The objects may be background objects.

Determining may include determining some background objects based on a user-specific code. Determining may include determining a background object to transform from the user-specific code based on a code matching rule in which a background object to transform is matched with a user-specific code.

Transforming may include transforming at least one of a color and a texture. A type of an attribute to be transformed in a background object may be determined based on the user-specific code.

The video watermarking method according to the disclosure may further include generating a user-specific code by encoding a user ID, and determining may include using the generated user-specific code.

The video watermarking method according to the disclosure may further include: acquiring watermarking information of a leaked video; inferring a user-specific code applied to transformation of an attribute of a background object appearing in the leaked video, based on the watermarking information; and acquiring a user ID by decoding the inferred user-specific code.

Inferring the user-specific code may include: determining some background objects of which attributes are transformed in the leaked video, with reference to the watermarking information; and inferring the user-specific code from the result of determining with reference to a code matching rule.

According to another aspect of the disclosure, there is provided a video streaming server including: a communication unit configured to receive a request for video streaming from a user, and to stream the requested video; a DB configured to store videos and watermarking information; and a processor configured to acquire the requested video and watermarking information from the DB, to determine some of objects appearing in the video according to the watermarking information, to transform attributes of the determined objects, and to stream the transformed video through the communication unit.

According to still another aspect of the disclosure, there is provided a method for tracing a video leakage path, the method including: acquiring watermarking information of a leaked video; determining a transformed background object in the leaked video with reference to the watermarking information; inferring a user-specific code from the result of determining; and acquiring a user ID by decoding the inferred user-specific code.

According to yet another aspect of the disclosure, there is provided a video leakage path tracing system including: a DB configured to store videos and watermarking information; and a processor configured to acquire a leaked video and watermarking information, to determine a transformed background object in the leaked video with reference to the acquired watermarking information, to infer a user-specific code from the result of determining, and to acquire a user ID by decoding the inferred user-specific code.

According to embodiments of the disclosure as described above, by watermarking an attribute of an object appearing in a video differently according to a user and providing the video, a watermark may be difficult to perceive, robustness against various attacks may be guaranteed, and a leakage path of a content may be checked.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 is a view illustrating a video watermarking method in a video streaming server according to another embodiment of the disclosure;

DETAILED DESCRIPTION

Hereinafter, the disclosure will be described in more detail with reference to the accompanying drawings.

There is provided an object attribute-based watermarking method for preventing leakage of a digital video content. The disclosure provides a technology for watermarking an attribute of a background object appearing in a video differently according to a user, and streaming data, so that the watermark is difficult to perceive, robustness against various attacks is guaranteed, and a content leakage path can be checked.

Figure 1:
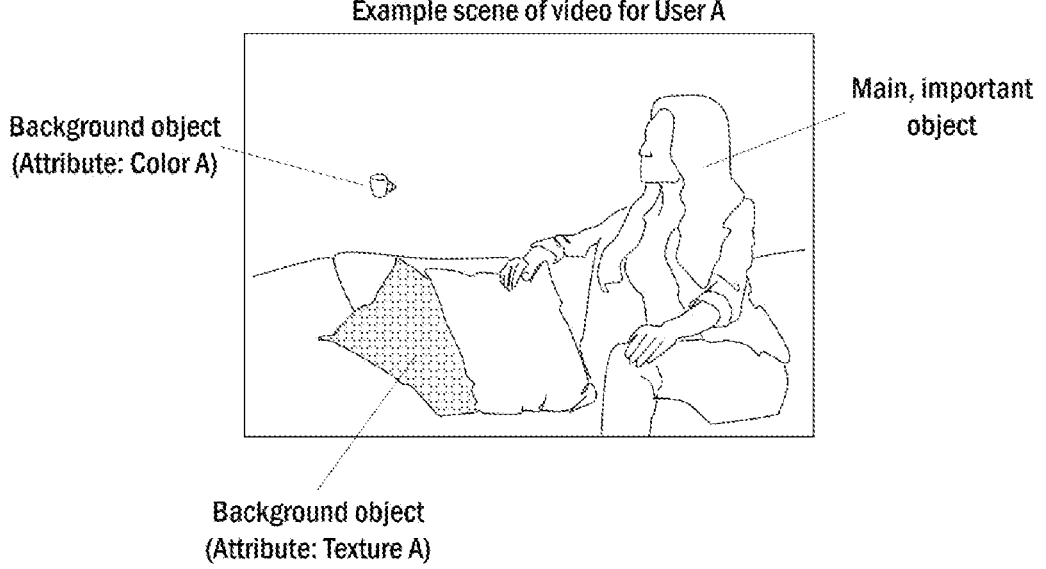
FIG. 1 is a view provided to explain a concept of a video watermarking method according to an embodiment of the disclosure.
Figure 2:
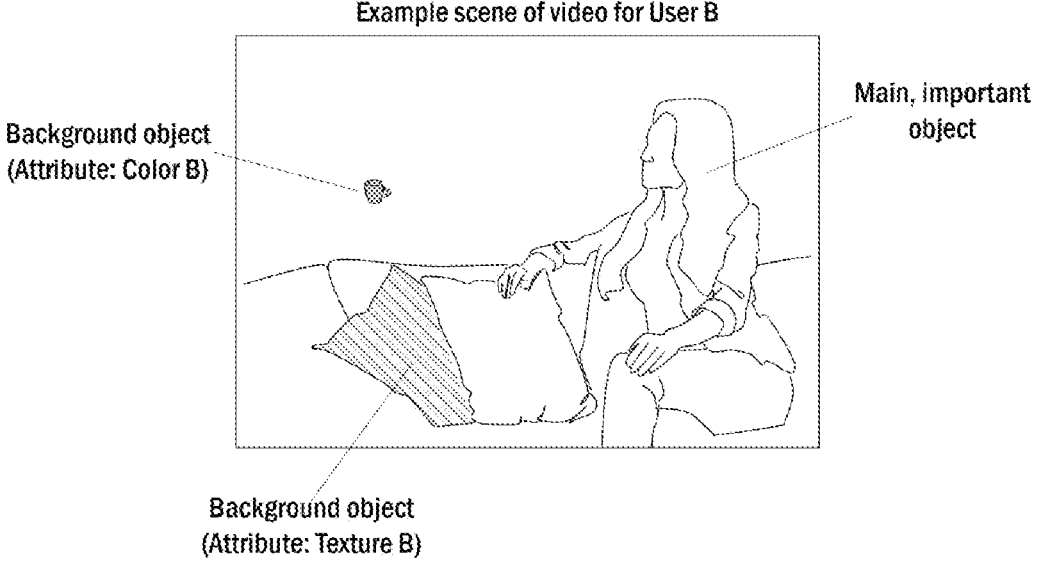
FIG. 2 is a view provided to explain the concept of the video watermarking method according to an embodiment of the disclosure.

FIG. 1 is a view provided to explain a concept of a video watermarking method according to an embodiment of the disclosure, and FIG. 2 is a view provided to explain the concept of the video watermarking method according to an embodiment. The method according to an embodiment may watermark by transforming an attribute of a background object, which is an unimportant part, rather than a foreground object which is an important object noticed by a viewer in a video content, differently according to a user (viewer).

For example, even when a user A and a user B view the same scene of a video, the scene that the user A is viewing (shown in FIG. 1) and the scene that the user B is viewing (shown in FIG. 2) may be different from each other. In this case, the different parts may be attributes (for example, color and texture in FIGS. 1, 2) of background objects (cup and cushion in FIGS. 1, 2) that do not influence users' appreciation of the video and understanding of the story.

Since what is transformed in the video content is a background object, the users may view the video without perceiving a watermark applied to the video. In addition, since the position or shape of the background object is not changed and only the attribute such as color or texture is transformed, there is almost no damage being applied to the video content itself and robustness against various attacks is provided.

The watermark applied differently according to a user, that is, the attribute of the background object transformed differently according to a user, may be used for tracing a leakage path when the video content is leaked hereinafter, that is, a user who leaks the video.

Figure 3:
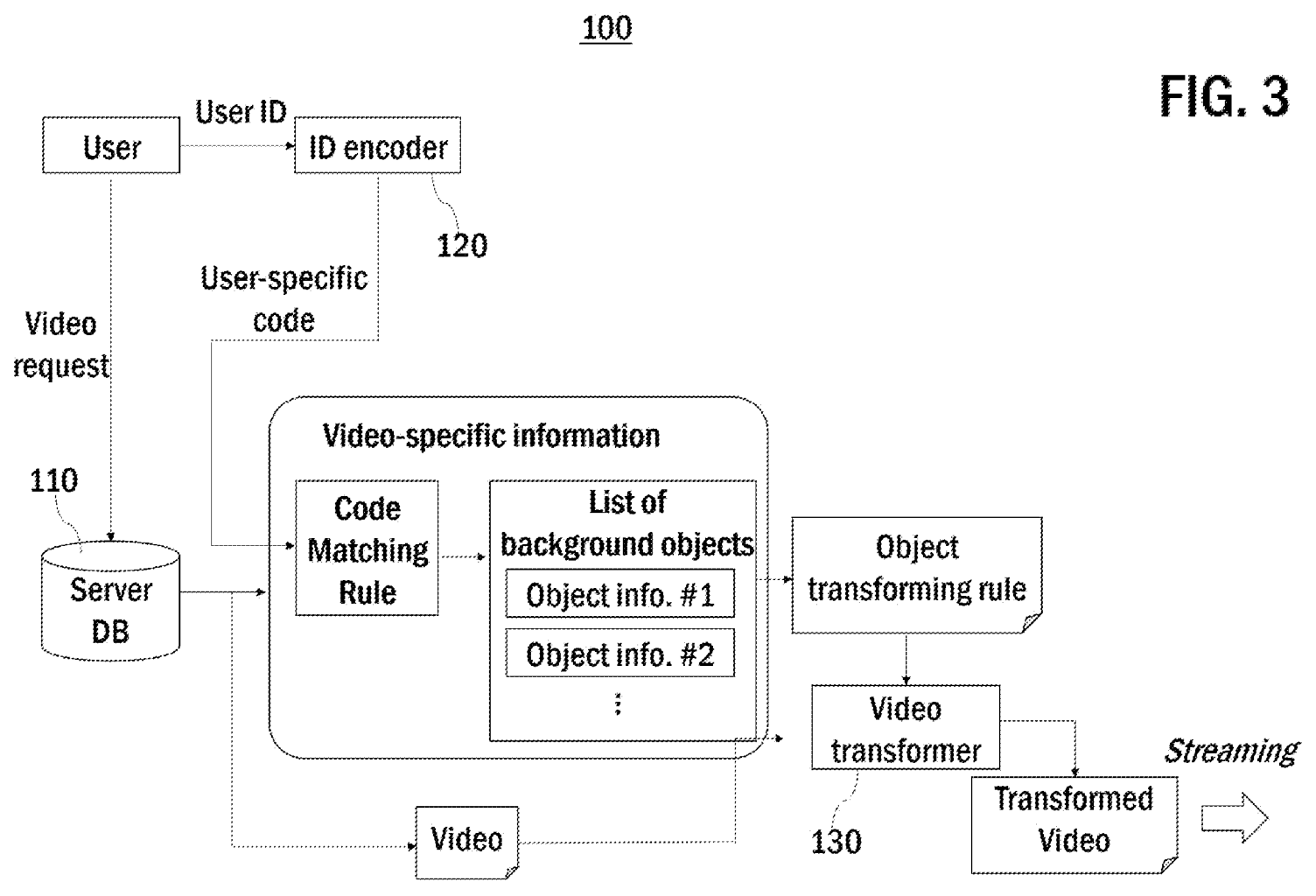

FIG. 3 is a view illustrating a video watermarking method in a video streaming server according to another embodiment.

As shown in FIG. 3, when a user requests a video content that the user wishes to view from a streaming server 100, the streaming server 100 acquires the video requested by the user and information necessary for watermarking the corresponding video from a database (DB) 110.

The information necessary for watermarking (hereinafter, referred to as 'watermarking information') contains a code matching rule and a list of background objects, and may be defined differently according to a video.

The list of background objects contains information on background objects (Object info. #1, Object info. #2, . . . ) that do not raise the matter even when they are transformed for watermarking in the video content. As described above, the background objects are objects that do not cause any inconvenience in appreciating the video and understanding the story even when they are transformed. The information on the background objects may include the following information:

1) Information on a time at which a corresponding background object appears;
2) Information on a position of a corresponding background object;
3) Type (class) of a corresponding background object;
4) Attribute information to be transformed for a corresponding background object.

The attribute to be transformed in the background object may include a color, a texture of the background object. The attribute needs to be defined to be transformed to have a much different value from an original attribute value so as to be robust against various attacks. For example, if the color of a corresponding background object is red, the color may be defined to be transformed to a much different color, such as blue, green, rather than a similar color such as pink.

An ID encoder 120 generates a user-specific code by encoding a user ID. The code matching rule is a rule for determining a background object to transform based on the user-specific code.

For example, if the user-specific code is a 4-digit number (abcd), the streaming server 100 may determine the 'ab'-th background object information and the 'cd'-th background object according to the code matching rule. Specifically, if the user-specific code is "0513", information on the 05-th background object (Object info. #05) and information on the 13-th background object (Object info. #13) may be determined.

A video transformer 130 may watermark by transforming corresponding background objects in the video with reference to the determined information on the background object. Accordingly, a video in which some background objects are transformed may be streamed to a user. For natural transformation, the video transformer 130 may utilize a deep learning algorithm or an image processing technique.

Figure 4:
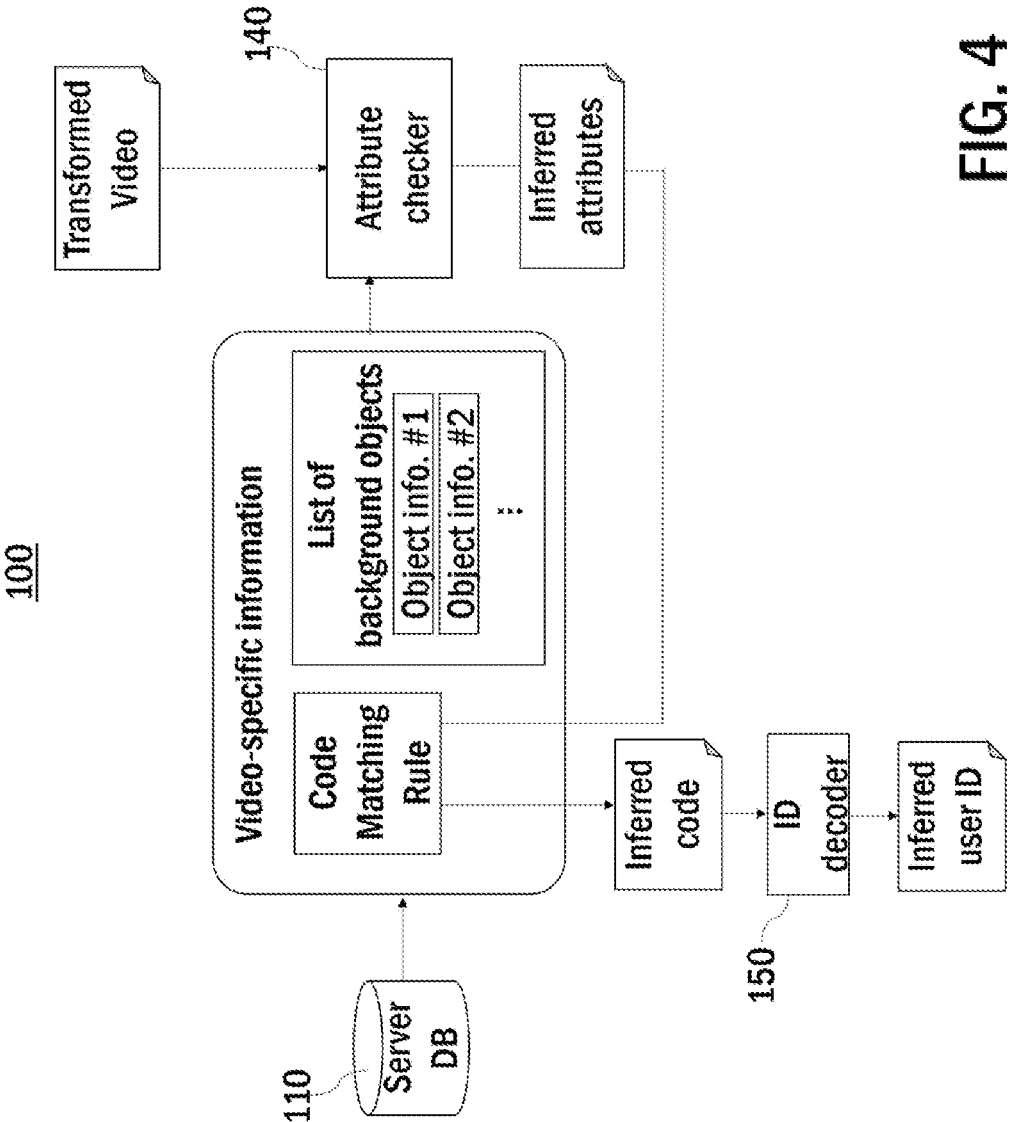
FIG. 4 is a view provide to explain a method of tracing a video leakage path in a video streaming server according to still another embodiment of the disclosure.

FIG. 4 is a view provided to explain a method for tracing a video leakage path in the video streaming server 100 according to still another embodiment.

When a streamed video is illegally leaked, watermarking information of the leaked video is acquired from the DB 110 in order to trace a leakage path. By doing so, a code matching rule of the leaked video and a list of background objects are acquired.

Thereafter, an attribute checker 140 grasps attributes of the background objects in the background object list and checks whether the attributes are transformed, and determine background objects of which the attributes are transformed.

The streaming server 100 infers a user-specific code from the result of determining by the attribute checker 140 with reference to the code matching rule. For example, when the background objects of which the attributes are transformed are the 05-th background object and the 13-th background object, and the code matching rule provides that background object information corresponding to the first two digits and the last two digits in the user-specific code are determined, the streaming server 100 may infer the user-specific code as "0513".

Thereafter, an ID decoder 150 restores a user ID by decoding the inferred user-specific code. The restored user ID may be regarded as an ID of a user who leaks the video.

Figure 5:
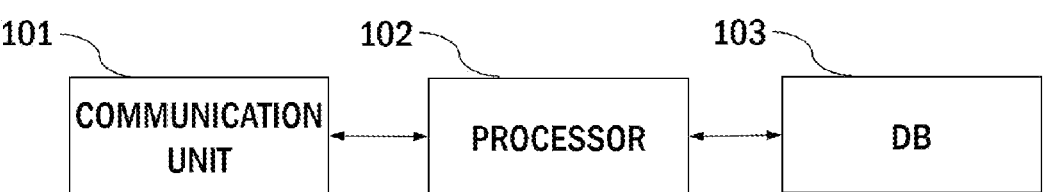
FIG. 5 is a view illustrating a hardware configuration of a video streaming server according to yet another embodiment of the disclosure.

FIG. 5 is a view illustrating a hardware configuration of the video streaming server 100 according to yet another embodiment. The video streaming server 100 according to an embodiment may include a communication unit 101, a processor 102, and a DB 103 as shown in FIG. 5.

The communication unit 101 is a communication means for receiving a request of a user and streaming a video content requested by the user.

The processor 102 performs the watermarking process proposed in FIG. 3 and user ID encoding/decoding, video transformation (watermarking), attribute checking necessary for tracing a leakage path, proposed in FIG. 4.

The DB 103 is a storage in which videos and watermarking information are stored.

Up to now, the object attribute-based watermarking method for preventing leakage of digital contents has been described in detail with reference to preferred embodiments.

Embodiments of the disclosure propose a new watermarking method which provides a video content having a different object attribute according to a user, thereby making it difficult to perceive a watermark, achieving robustness against various attacks, and checking a leakage path of a content.

In the above-described embodiments, the background objects to be transformed are determined based on the user-specific code and the code matching rule. Changes can be made thereto. For example, a type of an attribute to be transformed in a background object may be determined based on the user-specific code and the code matching rule. That is, only the color of a background object may be transformed or only the texture may be transformed according to the user-specific code, or both the color and the texture may be transformed.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the at without departing from the scope of the present disclosure claimed in claims, and also, changed embodiments should not be understood as being separate from the technical idea or prospect of the present disclosure.

What is claimed is:

1. A video watermarking method comprising:
   receiving a request for video streaming of a video from a user;
   acquiring the video and watermarking information;
   identifying, by analyzing frame-wise metadata of the video, one or more background objects corresponding to a watermarking rule defined for a user-specific code;
   selecting, from among a plurality of visual attributes of each identified background object, at least one attribute including a color, texture, or brightness value designated by the watermarking rule;
   transforming the selected attribute according to the watermarking information by adjusting pixel values belonging to the background object such that a visual appearance of the video remains substantially unchanged but the transformation can be detected through comparison with original attribute parameters; and
   streaming the transformed video.

2. The video watermarking method of claim 1, wherein the determining comprises determining the background objects based on a user-specific code.

3. The video watermarking method of claim 2, wherein the determining comprises determining a background object to transform from the user-specific code based on a code matching rule in which the background object to transform is matched with the user-specific code.

4. The video watermarking method of claim 3, wherein the transforming comprises transforming at least one of a color and a texture.

5. The video watermarking method of claim 4, wherein a type of an attribute to be transformed in the background object is determined based on the user-specific code.

6. The video watermarking method of claim 2, further comprising generating the user-specific code by encoding a user ID, and
   determining the background objects using the generated user-specific code.

7. The video watermarking method of claim 6, further comprising:
   acquiring the watermarking information of a leaked video;
   inferring the user-specific code applied to transformation of an attribute of a background object appearing in the leaked video, based on the watermarking information; and
   acquiring the user ID by decoding the inferred user-specific code.

8. The video watermarking method of claim 7, wherein the inferring the user-specific code comprises:
   determining the background objects of which attributes are transformed in the leaked video, with reference to the watermarking information; and inferring the user-specific code from the result of determining with reference to a code matching rule.

9. The system of claim 1, wherein the attributes of the determined objects include a respective color and/or a texture of the determined objects, and wherein the transforming comprises transforming the respective color and/or a texture of the determined objects according to the watermarking information.

10. A video streaming server system comprising:

a processor comprising:

a communication unit configured to receive a request for video streaming of a video from a user, and to stream the requested video; and a Database (DB) configured to store videos and watermarking information; and the processor configured to:

acquire the requested video and watermarking information from the DB;

identify, by analyzing frame-wise metadata of the video, determine one or more background objects corresponding to a watermarking rule defined for a user-specific code;

select, from among a plurality of visual attributes of each identified background object, at least one attribute including a color, texture, or brightness value designated by the watermarking rule;

transform the selected attribute according to the watermarking information by adjusting pixel values belonging to the background object such that a visual appearance of the video remains substantially unchanged but the transformation can be detected through comparison with original attribute parameters; and stream the transformed video through the communication unit.

11. The system of claim 10, wherein, for the determining, the processor is configured to determine the background objects based on a user-specific code.

12. The system of claim 11, wherein, for the determining, the processor is configured to determine a background object to transform from the user-specific code based on a code matching rule in which the background object to transform is matched with the user-specific code.

13. The system of claim 12, wherein, for the transforming, the processor is configured to transform at least one of a color and a texture.

14. The system of claim 13, wherein a type of an attribute to be transformed in the background object is determined based on the user-specific code.

15. The system of claim 11, wherein the processor is configured to generate the user-specific code by encoding a user ID, and determine the background objects using the generated user-specific code.

16. The system of claim 15, wherein the processor is configured to:

acquire the watermarking information of a leaked video;

infer the user-specific code applied to transformation of an attribute of a background object appearing in the leaked video, based on the watermarking information; and acquire the user ID by decoding the inferred user-specific code.

17. The system of claim 16, wherein, for the inferring the user-specific code, the processor is configured to:

determine the background objects of which attributes are transformed in the leaked video, with reference to the watermarking information; and infer the user-specific code from the result of determining with reference to a code matching rule.

18. A method for tracing a video leakage path, the method comprising:

acquiring watermarking information of a leaked video;

identifying, from the leaked video, at least one background object whose pixel values have been changed according to a watermarking rule associated with a user-specific code that determined the identified at least one background object by analyzing frame-wise metadata of the leaked video;

comparing attribute parameters of the identified background object with corresponding original attribute parameters stored in association with the watermarking information to infer a user-specific code from the result of determining; and acquiring a user ID by decoding the inferred user-specific code.

\*    \*    \*    \*    \*